United States Patent [19]

Woodrum et al.

[11] Patent Number: 5,350,799
[45] Date of Patent: Sep. 27, 1994

[54] PROCESS FOR THE CONVERSION OF FINE SUPERABSORBENT POLYMER PARTICLES INTO LARGER PARTICLES

[75] Inventors: Guy T. Woodrum, Chesapeake; Thomas H. Majette, Portsmouth, both of Va.

[73] Assignee: Hoechst Celanese Corporation, Somerville, N.J.

[21] Appl. No.: 694,445

[22] Filed: May 7, 1991

Related U.S. Application Data

[63] Continuation-in-part of Ser. No. 531,194, May 31, 1990.

[51] Int. Cl.$^5$ ............................ C08F 6/00; C08B 31/00
[52] U.S. Cl. ................................ 525/54.3; 525/54.31; 525/54.32; 525/242
[58] Field of Search ............... 525/54.2, 54.3, 54.31, 525/54.32, 242; 523/353

[56] References Cited

U.S. PATENT DOCUMENTS

| | | | |
|---|---|---|---|
| 2,985,625 | 5/1961 | Jones | 525/54.2 |
| 3,935,099 | 1/1976 | Weaver et al. | 524/734 |
| 4,041,228 | 8/1977 | Gross | 525/385 |
| 4,076,663 | 2/1978 | Masuda et al. | 525/54.31 |
| 4,286,082 | 8/1981 | Tsubakimoto et al. | 524/547 |
| 4,386,120 | 5/1983 | Sato et al. | 427/213 |
| 4,446,261 | 5/1984 | Yamasaki et al. | 524/37 |
| 4,587,308 | 5/1986 | Makita et al. | 525/373 |
| 4,698,404 | 10/1987 | Cramm et al. | 525/343 |
| 4,950,692 | 8/1990 | Lewis et al. | 521/45 |
| 5,064,582 | 11/1991 | Sutton et al. | 264/37 |
| 5,171,781 | 12/1992 | Farrar et al. | 524/547 |

FOREIGN PATENT DOCUMENTS

0326382 8/1989 European Pat. Off. ........ C08J 3/12

*Primary Examiner*—John Kight, III
*Assistant Examiner*—Jeffrey Culpeper Mullis
*Attorney, Agent, or Firm*—Hugh C. Crall

[57] ABSTRACT

This invention is a method for converting fine particles of superabsorbent polymers into larger particles. The invention is primarily directed to aqueous solution processes for preparing superabsorbent polymers. In such aqueous solution polymerization methods, the polymerization reaction product is a high viscosity gel which is dried and ground into particles. In this grinding step, a portion of the product is produced as undesired fine particles having poor absorbency and poor fabrication properties; i.e. they "gel block" and dust. According to the invention, fine superabsorbent polymer particles (up to about 3 parts) are mixed with the high viscosity reaction product gel (100 parts) containing about 20 parts by weight of superabsorbent polymer and water (5 parts per part of recycled particles) to form a mixture with improved rheological properties. The resulting mixture can be processed at a higher rate than a reaction product gel of equal solids content which results in a higher product yield and increased productivity.

7 Claims, No Drawings

PROCESS FOR THE CONVERSION OF FINE SUPERABSORBENT POLYMER PARTICLES INTO LARGER PARTICLES

CROSS REFERENCE TO RELATED APPLICATIONS

This application is a continuation-in-part of U.S. patent application Ser. No. 531,194 filed May 31, 1990; now allowed.

BACKGROUND OF INVENTION

This invention relates to water-absorbent polymers which are known in the art as "superabsorbent" polymers. These polymers have the capability to absorb large volumes of aqueous fluids and find use in the manufacture of disposable diapers, sanitary napkins and incontinent devices. Superabsorbent polymers are prepared from at least one monomer having a polymerizable double bond which is water soluble or which becomes water soluble upon hydrolysis. Examples of such polymers are crosslinked, partially neutralized, polymers and copolymers of acrylic acid, starch grafted, polymers and copolymers of acrylic acid polymers and starch-polyacrylonitrile grafted polymers. The preparation of such polymers is well known in the art; see for example U.S. Pat. No. 4,076,663 which describes the solution polymerization of starch grafted, acrylic acid polymers.

Superabsorbent polymers are prepared on a commercial scale by solution or suspension or emulsion polymerization processes. In the suspension or emulsion methods, the monomer is polymerized in the form of droplets dispersed in a non-aqueous suspension medium and recovered as fine particles of spheres. In the solution method, the monomer is polymerized in water to produce a high viscosity gel which is extruded into strands or films which are dried to remove the aqueous polymerization solvent and ground into particles. In this grinding step, fine particles (<75 microns) are produced which are undesired because they have poor fluid absorbency properties and they cause dusting problems in the fabrication processes for preparing end products. This invention is directed to polymers prepared by the solution polymerization method. It is the object of this invention to recycle undesired fine particles produced in the grinding step and to reform them into larger more useful particles.

SUMMARY OF THE INVENTION

This invention is directed to a process of recycling undesired fine particles of superabsorbent polymers into useful larger sized particles. The invention is primarily directed to a modification of a solution polymerization process for preparing superabsorbent polymers.

Superabsorbent polymers are well known in the art. These polymers have the capability to absorb aqueous fluids and are used primarily in the preparation of diapers and other such personal hygiene products.

In the solution polymerization method, a water soluble monomer or monomer mixture is dissolved in an aqueous polymerization medium. Initiators, antioxidants, crosslinkers and other additives are mixed into the monomer-water solution and polymerization is initiated. The resulting reaction product is in the form of a high viscosity gel. The high viscosity, gel-like reaction product is then processed into a film or a strand, dried and ground into particles which are screened or classified into various particle size fractions. Oversized and undersized particles are removed during the screening step of the process. Preferably the desired product should have a particle size distribution such that at least 50 percent by weight of the product has a particle size of 150 microns or greater with no more than 20 percent by weight being less than 75 microns; preferably there are no particles less than 100 microns. Particles less than 75 microns are undesired because they produce "gel blocking" (low absorbency) and dusting. Generally about 10 to 20 percent by weight of particles having a 75 micron or less particle size are produced in the standard grinding step.

We have found that up to about 3 parts of superabsorbent polymer having a particle size of 75 microns or less can be recycled into 95 to 100 parts of the polymerization reaction product of a solution polymerization having a solids content of about 20 percent. Surprisingly no significant increase in line pressure is observed when the mixture is pumped through process piping nor is product quality effected. The process of the invention is carried out by mixing 0.2 to 3.5, preferably 1 to 3 parts, of fine particles of superabsorbent polymer into about 95 to 100 parts of a solution polymerization reaction product under high intensity mixing conditions. The solution polymerization reaction product may contain about 10 to about 25 percent by weight of superabsorbent polymer; preferably about 20 percent. Four to about seven parts of water are added per part of polymer particles recycled.

DESCRIPTION OF THE PREFERRED EMBODIMENTS

This invention is directed to a method of recycling superabsorbent polymer particles in an aqueous solution polymerization process. Superabsorbent polymers are well known in the art. These polymers have the ability to absorb large quantities of aqueous fluids and may be selected from crosslinked, partially neutralized polyacrylic acid polymer (see U.S. Pat. No. 4,654,039), a crosslinked, partially neutralized star-acrylic acid graft polymer (U.S. Pat. No. 4,076,663), a crosslinked, partially neutralized copolymer of isobutylene and maleic anhydride (U.S. Pat. No. 4,389,513), a saponification product of a vinyl acetate-acrylic acid copolymer (U.S. Pat. No. 4,124,748), a hydrolyzate of acrylamide polymer or acrylamide copolymer (U.S. Pat. No. 3,959,569) or a hydrolyzate of an acrylonitrile copolymer (U.S. Pat. No. 3,935,099). The teachings of the above patents are hereby incorporated by reference. The aqueous solution polymerization method is also well known in the art and is described in the literature; see e.g. U.S. Pat. Nos. 4,465,039; 4,076,633; 4,286,082; and 4,525,527. The teachings of the cited patents are incorporated herein by reference.

The process steps of an aqueous solution polymerization process are polymerization, mastication or dispersion of the polymeric reaction product into a film or strand, drying the gel, particle grinding and screening. In the particle grinding and screening steps, about 10 to 20 percent by weight of the reaction product is recovered as fine particles having a particle size of 75 microns or less. These fine particles (<75 microns) are not desired because they have poor absorbency and they dust in subsequent fabrication steps.

The poor absorbency properties of <75 micron particles is due to "gel blocking". Gel blocking is an apparent reduction in fluid absorption caused by the formation of a highly fluid gel which encompasses or surrounds unwetted particles preventing further fluid transport to the fine superabsorbent particle's surface.

In accordance with the invention about 95 to 100 parts of the reaction product of a solution polymerization process containing 10 to 25 percent by weight of a superabsorbent polymer is mixed with about 0.2 to about 4.0 preferably 0.2 to 3.5 parts of fine superabsorbent particles having a particle size of 75 microns or less and about 4 to about 7 parts of water per part of fine superabsorbent particles. The resulting mixture exhibits improved flow characteristics over a solution polymerization reaction mixture having the same superabsorbent polymer content. Preferably about 1 to 3 parts of fine superabsorbent polymer particles and about 5 parts of water per part of said polymer particles are introduced into the reaction product stream having about 15 to 20 percent by weight polymer content.

Surprisingly, these mixtures may be pumped at a higher rate than a reaction product of an equivalent solids content without a significant increase in line pressure.

A superabsorbent polymer solution polymerization reaction product is in the form of a tough, rubber-like gel. In the process of the invention this gel is cut or dispersed into pieces, preferably by extruding the gel through a die and chopping the extruded strand into pellet-like pieces. Fine superabsorbent polymer particles are added to the dispersed reaction product gel and the resulting mixture is blended to disperse the polymer particles in the reaction product gel. Preferably about one part of water per part of fine superabsorbent polymer particles is added during the particle addition step to reduce dusting of the fine particles and to aid in the dispersion of polymer particles in the reaction gel. This blending step can be accomplished by extruding the gel-particle mixture through a die and chopping or pelletizing the resulting strand into pellet-like pieces. The resulting mixture is a dispersion of the fine superabsorbent polymer particles in the reaction gel. About 3-6 parts of water are added to the dispersion and mixing is continued to further disperse the superabsorbent particles in the reaction gel to form a substantially uniform mixture of the superabsorbent particles in the reaction gel. The last mixing step can be accomplished by extruding the particle-gel dispersion and water through a die.

A water-soluble crosslinker is preferably added with the water in the last mixing step of the process. Preferably about 0.001 to about 0.5 percent by weight of water soluble crosslinker based upon the weight of fine superabsorbent polymer particles is added; more preferably about 0.001 to about 0.1 percent.

About 1 to about 25 percent by weight of fine superabsorbent polymer particles based upon the solids content of the reaction gel may be recycled according to the process of the invention. However, due to the high viscosity of such reaction products, it is preferred to about 20 percent or less of the fine particles in order to effect a good dispersion of the polymer particles in the reaction product gel. Similarly, although it would be possible to carry out the process of the invention in a batch manner, a continuous process is preferred since a continuous process reduces the difficulty of the mixing of the solid particles into the high viscosity gel and it minimizes shearing of the polymer chains.

Preferably, the fine superabsorbent polymer particles are continuously added to the chopped reaction product gel in a continuous mixing zone. About one part of water may be added per part of the recycled superabsorbent polymer particles. In percent terms, generally about 15 to 25 percent of the water used in the process is added with recycled fine superabsorbent particles. After mixing the fine particles into the reaction gel, the remainder of the water is added to the gel-particle dispersion to form a substantially uniform mix of gel and recycled particles. Preferably with the second water addition, a water soluble crosslinker is added to the particle-gel mixture. The addition of crosslinker at this point improves the performance properties of the resulting superabsorbent product. The resulting process stream is mixed, dried, ground and screened in the normal manner using techniques and equipment well known in the art.

The following examples illustrate the invention. These examples contemplate conducting the process in a continuous manner using a two step addition procedure outlined above for incorporating the fine superabsorbent particles into the reaction gel. The examples illustrate results obtained on a continuous solution polymerization line and are simplified to omit unnecessary detail.

EXAMPLE 1

A piping system designed to operate at a maximum line pressure of 200 psi was used in this example. This system contained a 200 psi pressure relief device and is operated at 180 psi to accommodate occasional pressure surges.

At 180 psi line pressure, this system was used to transfer a 16-17% solid, gel-like reaction product of a superabsorbent, solution, polymerization process and the maximum transfer rate was determined at 180 psi operation pressure.

This superabsorbent polymer in its dry, powder form has the following typical properties:
 total absorbency (g/g-0.9% Saline)—50
 gel strength (Shear modulus dynes/cm)—80,000
 moisture content—8%
 type—starch-grafted polyacrylic acid The polymer transfer rate was determined and its value established as a relative transfer rate of 100, i.e. if the actual transfer rate was 1000 lbs per hour, that value was established as the maximum pumping rate and equal to 100.

EXAMPLE 2

In this example, the same reaction product and piping system are used as were used in Example 1. A mixture was prepared containing 95.9 parts (16-17% solids) of reaction product, 2.4 parts of the particulate superabsorbent polymer having a particle size of 75 microns or less and 12 parts of process water. This mixture was mixed into a substantially uniform state and pumped into the piping system. At 180 psi, a relative transfer rate of 110.9 was achieved for this mixture.

A comparison of the results of Example 1 and Example 2 shows that 10.9 percent increase in productivity was achieved and 15 parts of undesired fine particles were recycled. When the polymer gel from Examples 1 and 2 were dried and ground, the amount of fines (<75 microns) and the product quality were essentially the same.

EXAMPLE 3

Example 2 is repeated except 3.2 parts of the particulate fine superabsorbent polymer and about 16 parts of water are added to the reaction product gel. The relative transfer rate for this mixture was determined to be less than 100.

This Example is repeated. A relative transfer rate in excess of 100 is achieved. Mechanical problems are attributed to the first unsuccessful trial reported above.

EXAMPLE 4 & 5

Example 2 is repeated except with 0.8 parts of particulate fine superabsorbent polymer in Example 4 and 1.6 parts in Example 5. Five parts of process water per part of powder are used in each example. In both examples the relative transfer rate exceeds 100.

EXAMPLE 6

Example 1 is repeated using a relative transfer rate of 110.9. The 200 psi maximum pressure rating was about to be exceeded and the transfer rate is reduced to 100 in order to maintain the transfer pipe pressure at 180 psi.

The above examples illustrate the invention. Modification of the invention will be apparent to one skilled in the art. Various additives such as crosslinkers, antioxidants fillers etc. can be added to superabsorbent polymer mixture during the dispersion of the superabsorbent particles into the aqueous solution, polymerization reaction product.

Exemplary crosslinking compounds are water-soluble diglycidyl ether compounds, haloepoxy compounds and aldehydes which form covalent bonds between the polymeric chains of the superabsorbent composition. Also ionic crosslinkers of polyvalent inorganic compounds may be used. Exemplary crosslinkers are ethylene glycol-diglycidyl ether, dipropylene glycol-diglycidyl ether, (poly)-ethylene glycol-diglycidyl ether, diethylene glycol-diglycidyl ether, (poly)-glycerin-diglycidyl ether, sodium aluminum sulfate, methyl-epichlorohydrin, glyoxal.

Percentage values used in this application and its claims are weight percent unless otherwise stated. The term, substantially uniform mixture as used in the claims is intended to mean that recycled fine superabsorbent particles are not readily visible to the human eye as white specks of agglomerated powder and the mixture has a generally uniform appearance to the eye.

We claim:

1. A method of forming fine particulate superabsorbent particles into larger particles which comprises:
   (a) adding fine superabsorbent polymer particles having a particle size about 75 micron or less to a superabsorbent polymer solution polymerization reaction product gel and forming a dispersion of said particles in said gel;
   (b) adding water to said dispersion of said gel and said particles;
   (c) mixing said water and said dispersion to form a substantially uniform mixture of said particles in said reaction gel; and
   (d) drying said mixture.

2. A method of claim 1 wherein about 4 to 7 parts of water per part of said particles are added to said dispersion.

3. A method according to claim 2 wherein said particles are added to said gel in amount of about 0.2 to 4 parts per 95 to 100 parts of said gel wherein said gel has a superabsorbent polymer content from about 10 to about 25 percent by weight.

4. A method of claim 2 wherein about 1 part of water per part of fines is added during the particle addition step of said process.

5. A method according to claim 2 wherein about 0.001 to 0.5 percent water soluble crosslinker is added to said dispersion based upon the weight of said particles.

6. A method according to claim 5 wherein said crosslinker is added in amount from about 0.001 to 0.1 percent.

7. A method according to claim 6 wherein said crosslinker is alkylene glycol diglycidyl ether.

* * * * *